US005719670A

United States Patent [19]
Duboz et al.

[11] Patent Number: 5,719,670
[45] Date of Patent: Feb. 17, 1998

[54] INTEGRATED DIRECTION FINDER

[75] Inventors: Jean-Yves Duboz, Cachan; Philippe Bois, Cesson, both of France

[73] Assignee: Thomson-CSF, Paris, France

[21] Appl. No.: 555,323

[22] Filed: Nov. 8, 1995

[30] Foreign Application Priority Data

Nov. 10, 1994 [FR] France .................. 94 13550

[51] Int. Cl.$^6$ .................. G01B 11/26
[52] U.S. Cl. .................. 356/141.2; 250/206.1
[58] Field of Search .................. 356/141.2, 141.3, 356/141.5; 250/203.1, 206.1, 237 R

[56] References Cited

U.S. PATENT DOCUMENTS

| 4,777,360 | 10/1988 | Carner, Jr. .................. 250/231 R |
| 4,946,277 | 8/1990 | Marquet et al. .................. 356/141 |
| 5,086,327 | 2/1992 | Rosencher et al. . |
| 5,187,715 | 2/1993 | Weisbuch et al. . |
| 5,228,777 | 7/1993 | Rosencher et al. . |
| 5,264,910 | 11/1993 | Hill .................. 356/141 |
| 5,326,984 | 7/1994 | Rosencher et al. . |
| 5,604,695 | 2/1997 | Cantin et al. .................. 356/121 |

FOREIGN PATENT DOCUMENTS

| 0 310 493 | 4/1989 | European Pat. Off. . |
| 0 489 644 | 6/1992 | European Pat. Off. . |
| 2 232 550 | 12/1990 | United Kingdom . |

Primary Examiner—Mark Hellner
Attorney, Agent, or Firm—Oblon, Spivak, McClelland, Maier & Neustadt, P.C.

[57] ABSTRACT

Disclosed is an integrated direction finder that can be used to determine the direction of a light beam and, in particular, a laser beam. This direction finder has a substrate transparent to the light beam and means on the rear face to channel a part of the light flux received on this face to the front face which has several photodetector elements. Application to optical measurements.

16 Claims, 4 Drawing Sheets

INTEGRATED DIRECTION FINDER

BACKGROUND OF THE INVENTION

1. Field of the Invention

The field of the invention is that of direction finders which are devices that can he used to determine the direction of a light beam and notably a laser beam. These devices are used frequently in optical applications or in settings for optical measurements when it is sought to localize or align a light beam.

2. Description of the Prior Art

At present, there are different types of direction finders. These direction finders have a hybrid structure. They comprise firstly a substrate with a photodetection zone and, secondly, associated with the substrate or attached to the substrate, means to direct the light beam towards the photodetection zone.

These means may be formed, for example, by the insertion of a diaphragm before a photodetector provided with several (preferably four) photodetection elements with the measurement of the response on each detector element. FIG. 1 illustrates this type of prior art device wherein the diaphragm is centered in the middle of the detector. Depending on the angle of incidence of the light beam, the detector elements are illuminated differently, and the comparison of the responses on the different detector elements gives the angle of incidence sought. Indeed, as can be seen in FIGS. 1a and 1b, the angle θ can be measured from the distance H defined between the diaphragm and the elementary detectors, the dimensions of the aperture of the diaphragm (for example a square with a side d) and the dimensions of the photodetectors (for example a square with a side a). FIG. 1b gives a schematic view of the image of the diaphragm on the set of four detectors illuminated by the light beam having an incidence θ. The currents measured $i_1$, $i_2$, $i_3$, $i_4$ corresponding respectively to the photodetectors 1, 2, 3 and 4 enable the determining of the surface areas $S_1$, $S_2$, $S_3$, $S_4$ and hence the determining of the parameters (xo, yo) corresponding to the center of the image of the diaphragm on the photodetection surface. On the basis of these coordinates, it is easily possible, by means of the equations, xo/h=tanθ$_1$
yo/h=tanθ$_2$ to define the two directions $\theta_1$ and $\theta_2$ of the light beam along the axes Z and Y defined in FIG. 1.

According to the prior art, it is also possible to design a direction finder by the attaching, to the substrate supporting the elementary detectors, of a cube having vertical reflective walls as shown in FIG. 2. The elementary detectors are, in this case, positioned around the cube. In the case of four pixels, these detectors are placed along the reflective faces of the cube. The comparison of the responses on the different detective elements enables the angle of incidence to be determined.

In these different examples of direction finders, the positioning of the external part (diaphragm or cube) with respect to the detector is a critical factor. In the case of the diaphragm, the positioning must be precise laterally and vertically. Furthermore, the vibrations, if any, and the thermal expansion which is different for the external part and for the detector have a direct effect the precision of the positioning.

SUMMARY OF THE INVENTION

This is why the invention proposes a monolithic integrated direction finder that enables the above-mentioned constraints to be overcome. The direction finder according to the invention has a substrate transparent to the wavelength of the incident beam for which it is sought to determine the direction.

More specifically, an object of the invention is a direction finder measuring the angle of incidence of a light beam with a wavelength λ wherein said direction finder comprises a substrate transparent at the wavelength λ, on the front face of the substrate a photodetection surface integrated with said substrate and, on the rear face, means integrated into said substrate to direct and transmit at least a part of the light beam irradiating the rear face towards the photodetection surface.

The photodetection surface may advantageously be constituted by four photodetection quadrants.

The means used to direct and transmit the light beam to the photodetection surface may include a diaphragm whose central axis coincides with the central axis of the photodetection surface.

These means may also comprise a cube whose walls along an axis perpendicular to the rear face of the direction finder are reflective for the light beam, the photodetection surface being distributed about a section corresponding to the section of the cube.

BRIEF DESCRIPTION OF THE DRAWINGS

The invention will be understood more clearly and other advantages shall appear from the following description, given on a non-restrictive basis, and from the appended figures of which.

MORE DETAILED DESCRIPTION

The direction finder according to the invention has an integrated structure, transparent at the wavelength of the light beam for which it is sought to determine the direction of incidence. It has a substrate with a photodetection surface, said substrate being illuminated on the rear face (the photodetection surface being on the front face). The working of this type of direction finder is similar to that of hybrid direction finders, which are generally irradiated on the front face. All that changes is the value of the optical index of the medium between the surface that channels the light beam and the photodetection surface. If θ corresponds to the external angle of the light beam and θint is the angle of incidence of this beam in the substrate having an index n, the measurement of photodetection gives the angle θint and it is possible thereby to determine the angle θ since we then have the relationship:

$$n \sin \theta\text{int} = \sin \theta \qquad (1)$$

In a first variant according to the invention, the integrated direction finder has a diaphragm prepared on one of the faces of the substrate, the photodetection zone being prepared on the other face.

Figure 1A:
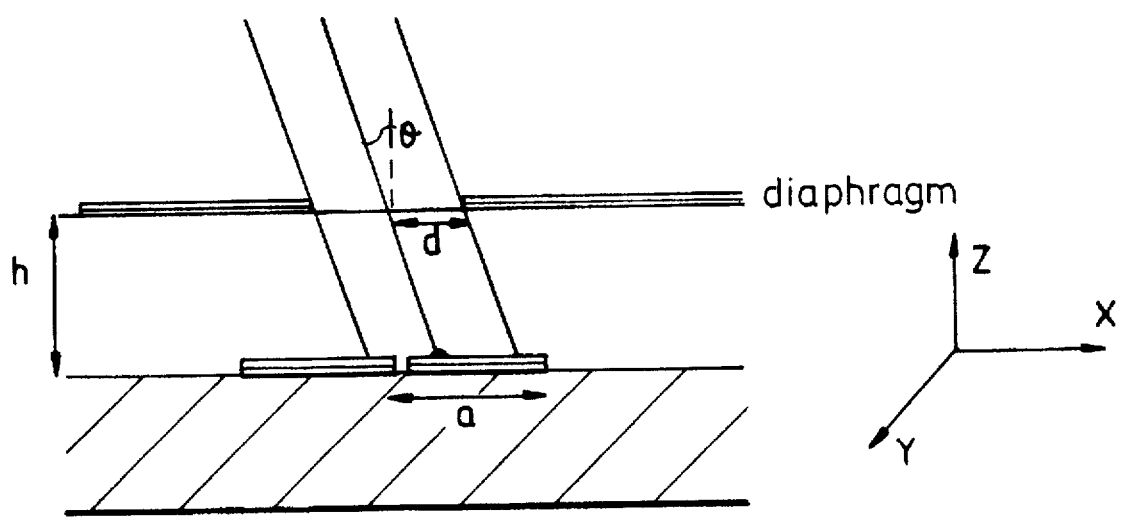
FIG. 1a illustrates an exemplary direction finder according to the prior art, using a diaphragm.
Figure 1B:
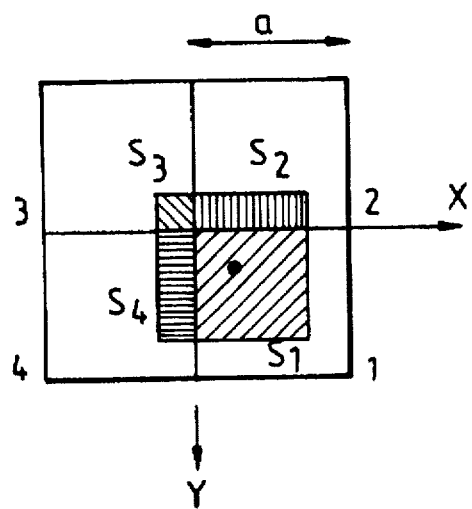
FIG. 1b gives a schematic view of the image of the diaphragm irradiated by the light beam on the photodetection surface.
Figure 2:
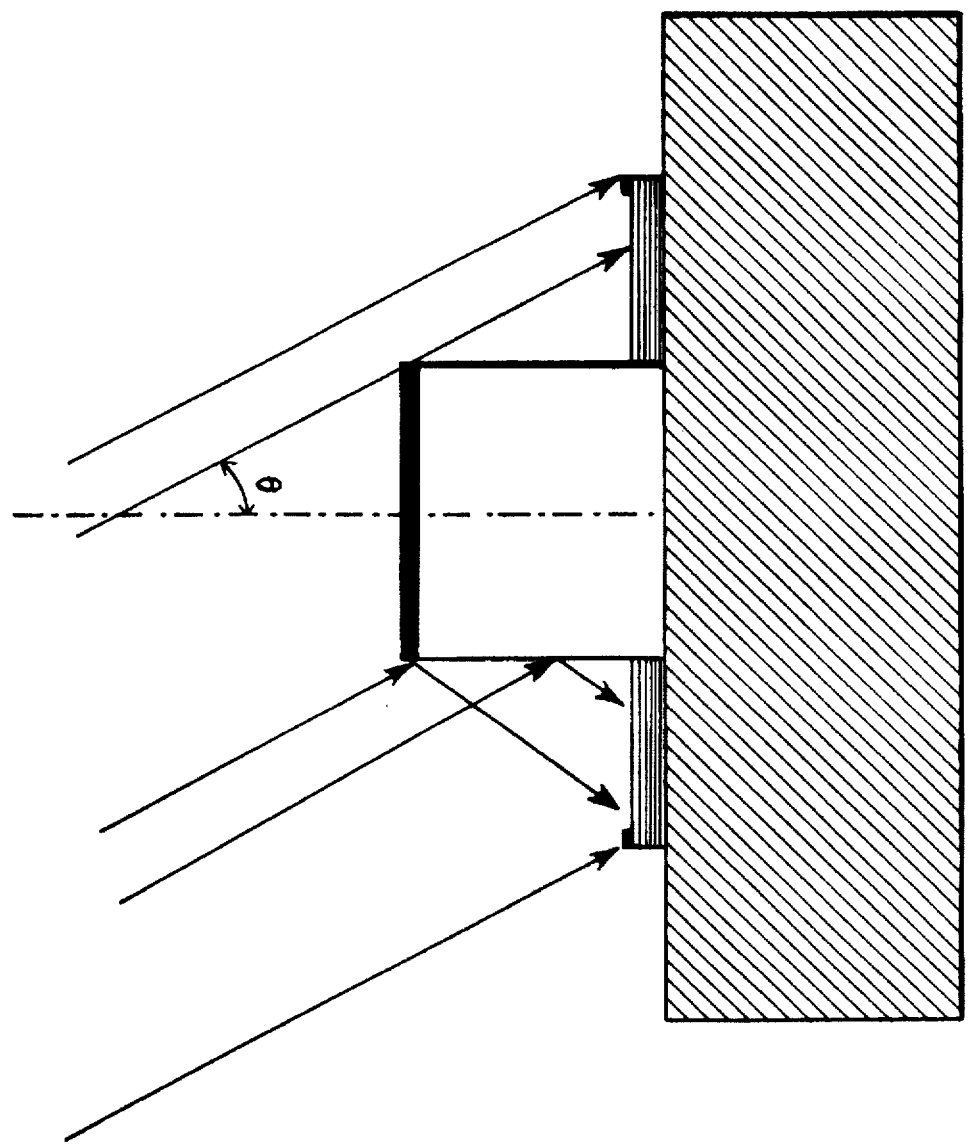
FIG. 2 illustrates an example of a direction finder according to the prior art, using a cube with reflective walls for the light beam.
Figure 3:
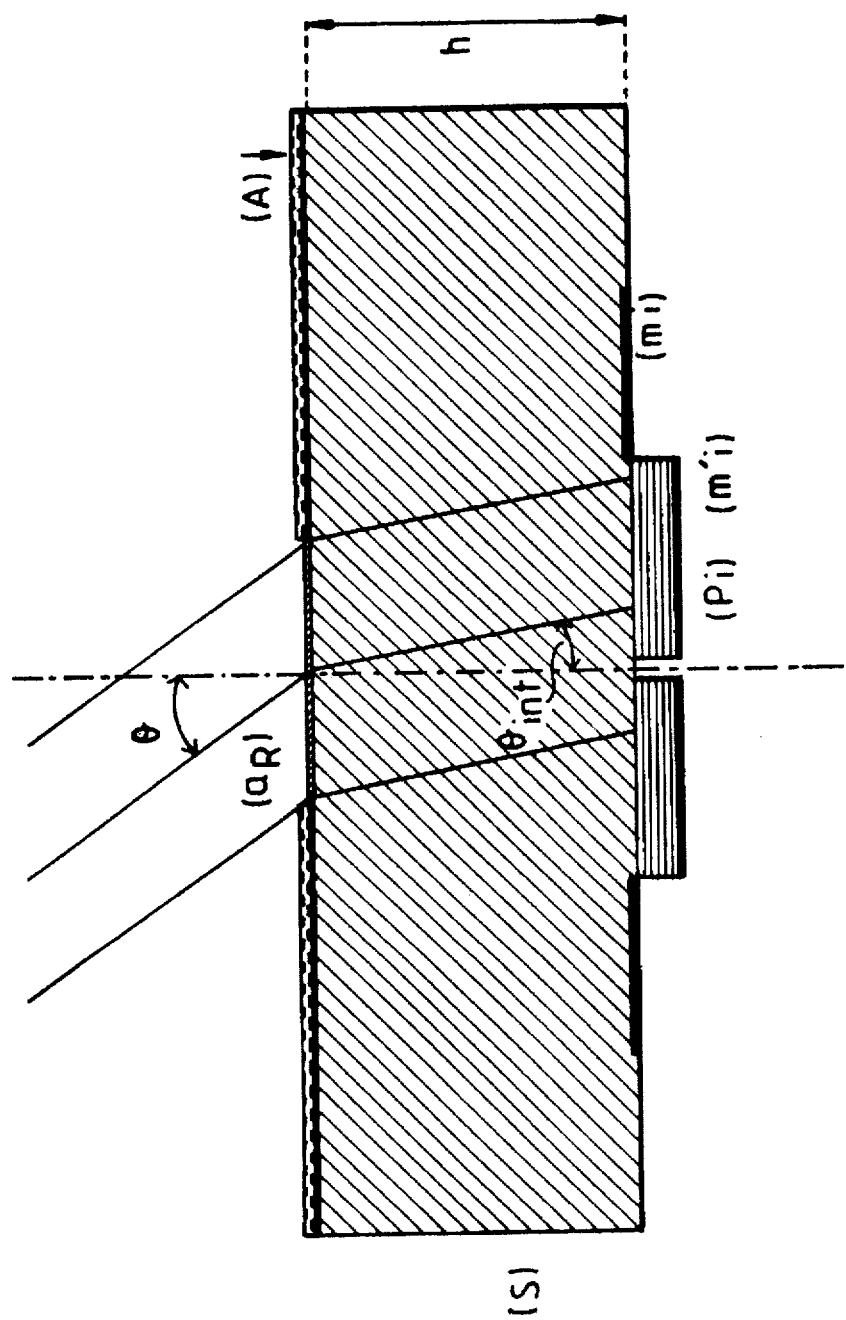
FIG. 3 illustrates an exemplary integrated direction finder according to the invention, comprising a diaphragm.

FIG. 3 illustrates this example of a direction finder. On the front face, the photodetection zone is formed by several photodetectors to perform a comparative measurement of the light fluxes received on the different photodetector elements (Pi). These different photodetector elements (Pi) are distributed about a central axis corresponding to the central axis of the diaphragm. Metallizations ($m_i$) and ($m_i'$) enable the currents generated by the photodetectors (Pi) to be measured.

The photodetector is formed by an absorbent layer (A), its aperture advantageously comprising an antireflective layer ($a_R$) for the maximum prevention of reflections at the interface between the exterior and the substrate (S). More specifically, the diaphragm may be made by standard techniques of microlithography and metallization on the rear face. The alignment of the lithography on the rear face with the photodetectors made on the front face may be done in infrared light if the substrate is transparent in the infrared (which is very frequent for semiconductors). The thickness of the substrate h may typically be of the same order of magnitude as the distance from the diaphragm to the photodetection zone in the case of a hybrid direction finder. The useful size of the elementary detectors may then be smaller than that of the hybrid direction finder, owing to the refraction in a medium with a higher index.

If θmax corresponds to the maximum accepted angle for which the different photodetectors may receive a light flux, the reduction $R_1$ of the dimensions of the detectors is equal to:

n cosθint max/cosθmax because of the relationship (1). In the case of semiconductor substrates made of Si, GaAs or InP (which are the most frequent cases to be considered for photodetection), the index n is in the range of 3.2. Thus, this reduction factor may typically be in the range of 3.6 (for θmax=30°) or even in the range of 6 (for θmax=60°).

This reduction of the surface area of the photodetectors is particularly valuable if the manufacture of large-sized detectors should raise problems owing to the presence of defects in the material.

For the detection of very small angles and notably in applications of direction finders mounted on goniometers, it may be useful to keep elementary photodetectors having large surface areas and increase the distance h, hence use thicker substrates to gain sensitivity. Indeed, in general, the angle θint is defined with the same degree of precision dθint as the angle dθ in the case of a hybrid direction finder. Consequently, the uncertainty dθ with regard to the external angle is increased by a factor β defined on the basis of the relationship nsineθint=sineθ giving therefore n cosθint dθint=cosθ dθ giving againβ=n cosθint/cosθ.

This factor well defines the increase in uncertainty as regards the external angle in the integrated structure as compared with that of the external angle in the hybrid structure, this being so for the same distance between a diaphragm and detectors.

By increasing this distance until the same surface area of photodetectors is made use of in both cases, this increase in uncertainty is reduced to the factor $β/R_2$ if $R_2$ is the ratio of the distance between diaphragm and detector in the integrated direction finder to the distance between diaphragm and detector in the hybrid direction finder. This new factor $β/R_2$ is then defined by the relationship:

$$β/R_2=(cosθint/cosθ).(cosθmax/cosθintmax)$$

This coefficient is equal to 1 for the limit angle and diminishes when the angle diminishes. It is thus possible, when θmax is close to 60°, to gain a factor of 2 in the precision of the external angle in the determining of small angles.

In another variant of the invention, the means used to direct the light beam to the photodetectors and define their orientation may include a cube on the surface of the substrate.

Figure 4:
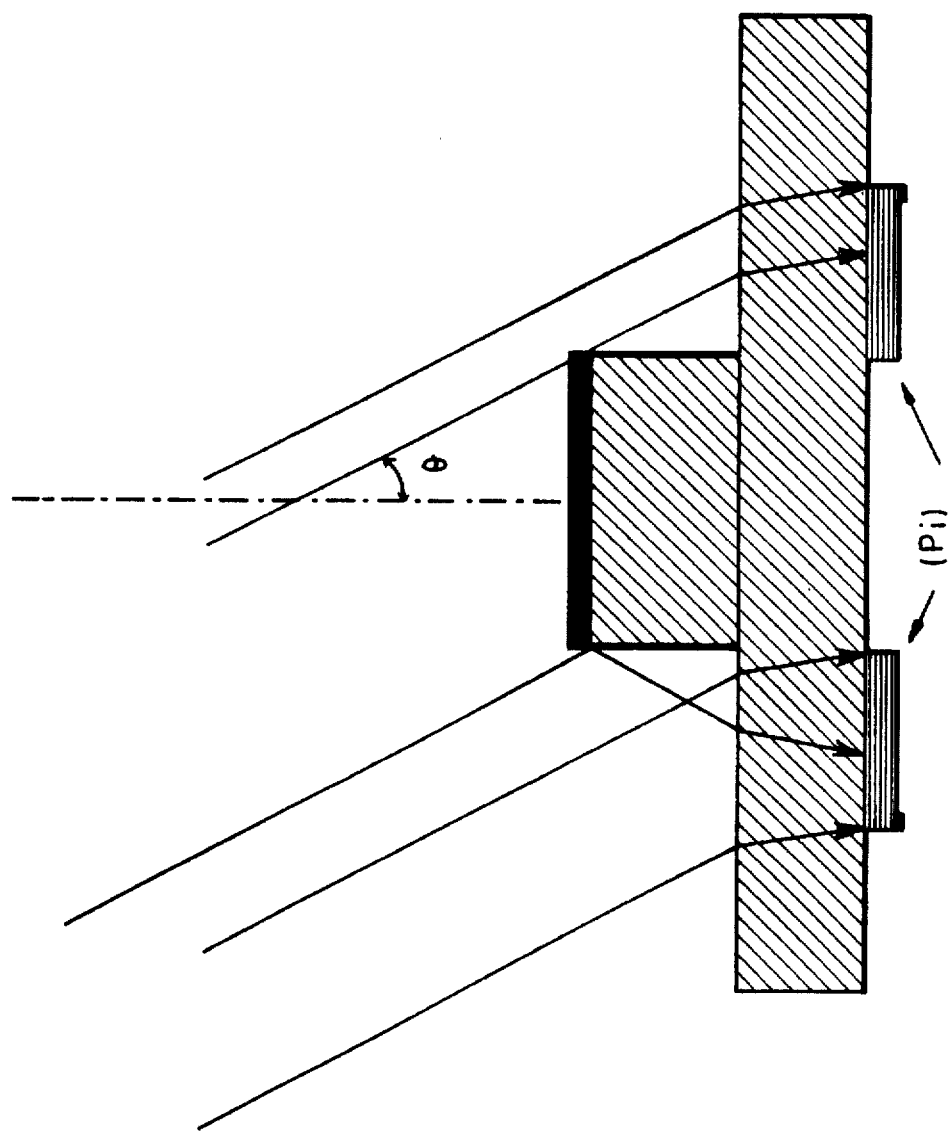
FIG. 4 illustrates an exemplary integrated direction finder according to the invention, comprising a cube with reflective walls.

Typically, a substrate may be etched on the rear face to demarcate the cube. The vertical walls of this cube are, in a second stage, metallized to enable the reflection of the incident beam through the substrate towards the photodetectors made on the front face. This metallization may typically be obtained by the non-directional deposition of metal, for example by spraying. As shown in FIG. 4, the different photodetectors are distributed around the location on the front face that is before the cube. The rear face of the cube is also covered with an absorbent layer to prevent parasitic reflections.

In all the variations of direction finders according to the invention, the photodetectors are made by the standard methods used on semiconductors. In the case of GaAs type substrates, it is possible, between two GaAs doped layers, to prepare an active photodetection structure of the quantum well structure type. Typically, the different metallizations may be made by the deposition of gold.

What is claimed is:

1. A monolithic integrated direction finding apparatus configured to measure an angle of incidence of a light beam with a wavelength λ, comprising:

a substrate being transparent to said light beam at said wavelength λ, said substrate comprising,
a front face on which said light beam is incident, and
a rear face;

a photodetection surface integrally formed in said rear face of said substrate and configured to produce an electrical current representative of a portion of said light beam that is incident thereon; and direction and transmission means for directing and transmitting said portion of said light beam that is incident on said front face to said photodetection surface formed in said rear face.

2. The apparatus of claim 1, wherein said photodetection surface is arranged into four photodetection quadrants.

3. The apparatus of claim 1, wherein:

said photodetection surface is formed about an axis that is perpendicular to said from face; and said direction and transmission means includes a diaphragm having an aperture formed therein about a central axis that coincides with said axis of said photodetection surface.

4. The apparatus of claim 2, wherein:

said photodetection surface is formed about an axis that is perpendicular to said front face; and said direction and transmission means includes a diaphragm having an aperture formed therein about a central axis that coincides with said axis of said photodetection surface.

5. The apparatus of claim 3, wherein said aperture comprises an anti-reflective layer.

6. The apparatus of claim 4, wherein said aperture comprises an anti-reflective layer.

7. The apparatus of claim 1, wherein said direction and transmission means comprises:

a cubed-shaped component having walls formed along an axis perpendicular to the rear face and being configured to reflect said portion of said light beam; and the photodetection surface being distributed about a section of said cubed-shaped component so as to receive said portion of said light beam.

8. The apparatus of claim 2, wherein said direction and transmission means comprises:

a cubed-shaped component having walls formed along an axis perpendicular to the rear face and being configured to reflect said portion of said light beam; and the photodetection surface being distributed about a section of said cubed-shaped component so as to receive said portion of said light beam.

9. The apparatus of claim 1, wherein said substrate comprises a semiconductor material.

10. The apparatus of claim 2, wherein said substrate comprises a semiconductor material.

11. The apparatus of claim 3, wherein said substrate comprises a semiconductor material.

12. The apparatus of claim 4, wherein said substrate comprises a semiconductor material.

13. The apparatus of claim 5, wherein said substrate comprises a semiconductor material.

14. The apparatus of claim 6, wherein said substrate comprises a semiconductor material.

15. The apparatus of claim 7, wherein said substrate comprises a semiconductor material.

16. The apparatus of claim 8, wherein said substrate comprises a semiconductor material.

* * * * *